United States Patent
Toyoda

(10) Patent No.: US 8,542,292 B2
(45) Date of Patent: Sep. 24, 2013

(54) FLICKER CORRECTION DEVICE, FLICKER CORRECTION METHOD AND FLICKER CORRECTION PROGRAM

(75) Inventor: Keiji Toyoda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/405,733

(22) Filed: Feb. 27, 2012

(65) Prior Publication Data

US 2012/0200736 A1     Aug. 9, 2012

Related U.S. Application Data

(63) Continuation of application No. PCT/JP2011/003192, filed on Jun. 7, 2011.

(30) Foreign Application Priority Data

Feb. 4, 2011    (JP) ................................. 2011-022849

(51) Int. Cl.
    *H04N 9/73*          (2006.01)
(52) U.S. Cl.
    USPC ..................................... 348/226.1; 348/227.1
(58) Field of Classification Search
    USPC ........ 348/226.1, 227.1, 228.1, 511; 382/103, 382/107, 271, 275, 236, 104
See application file for complete search history.

(56) References Cited

U.S. PATENT DOCUMENTS

| | | | |
|---|---|---|---|
| 8,115,828 B2 * | 2/2012 | Mikami | 348/228.1 |
| 8,144,213 B2 * | 3/2012 | Fuchikami et al. | 348/226.1 |
| 2006/0055823 A1 * | 3/2006 | Kinoshita et al. | 348/511 |

FOREIGN PATENT DOCUMENTS

| | | | |
|---|---|---|---|
| JP | 2004-222228 A | 8/2004 | |
| JP | 2009-081684 A | 4/2009 | |

OTHER PUBLICATIONS

International Search Report for PCT/JP2011/003192 dated Apr. 2, 2011.

* cited by examiner

*Primary Examiner* — Tuan Ho
*Assistant Examiner* — Chan Nguyen
(74) *Attorney, Agent, or Firm* — Pearne & Gordon LLP

(57) ABSTRACT

An average value calculation section 100 calculates an average value of each line during the validity period of an input image signal. A three-field average value calculation section 104 calculates a 50 Hz flicker signal from which the light and shade of a subject is removed. A difference value calculation section 105 subtracts an n-field preceding field line average value from the line average value of the present frame. Then, a 60 Hz flicker signal, from which the light and shade of the subject is removed, is calculated by dividing the difference value by the line average value of the present frame. A flicker determination section 112 determines whether flicker exists or not, and whether the flicker frequency is 50 Hz or 60 Hz, on the basis of the extraction results of the 50 Hz flicker component extraction section 108, and of the 60 Hz flicker component extraction section 109.

2 Claims, 7 Drawing Sheets

FLICKER CORRECTION DEVICE, FLICKER CORRECTION METHOD AND FLICKER CORRECTION PROGRAM

TECHNICAL FIELD

The present invention relates to a flicker correction technique for correcting a periodic change (hereinafter referred to as flicker) in an output signal of an imaging element, which change is caused by an illumination light source powered by an AC power supply.

BACKGROUND ART

Generally, in an illumination light source (such as an electric bulb, a fluorescent lamp, and a mercury lamp) powered by an AC power supply, lightness and darkness are repeated according to the change in luminance of the light source occurring at a double frequency of the AC power supply frequency. When under such illumination, a subject image is captured by an imaging element in which the exposure time for each line begins sequentially or by an imaging element in which the exposure time for each point begins sequentially, periodic horizontal stripes, so-called flickers, are caused in the image signal outputted from the imaging element. The period of the periodic horizontal stripes can be obtained from the drive frequency of the imaging element and the power supply frequency.

For example, since a common fluorescent lamp powered by a 50 Hz AC power supply repeats light emission at 100 Hz, the horizontal scanning (hereinafter referred to as line) frequency in the NTSC system is 15.75 kHz, and hence lightness and darkness are repeated at every 157.5 (=1/100 sec) lines. Further, since a least common multiple between the field period (1/59.94 sec) and the illumination flicker period (1/100 sec) is 1/20 sec, the same light and dark pattern is formed every 1/20 sec, that is, about every 3 fields.

Further, since a common fluorescent lamp powered by a 60 Hz AC power supply repeats light emission at 120 Hz, lightness and darkness are repeated at every 131.3 (=1/120 sec) lines. Further, since the deviation between the field period (1/59.94 sec) and the illumination flicker period (1/120 sec) is 16.67 μsec, the field period and the flicker period coincide with each other every 500 fields, and hence the flickers appear as horizontal stripes moving very slowly on the screen. The deterioration of image quality due to such illumination flicker becomes an obstacle to viewing.

In order to cope with such problem, a technique is disclosed in Patent Literature 1, in which line average values are stored in a memory for each one third phase of the period between subsequent coincidences between the field period and the flicker period, and in which a reference value, from which the influence of flicker is removed, is created by averaging the average values stored in the memory, and flicker correction is performed on the basis of the reference value. Particularly, in the NTSC system affected by flicker of 60 Hz, a flicker reduction device, which is hardly affected by movement of a subject, is realized in such a manner that, when the subject is stationary, flicker correction is performed, and that, when the subject is moving, the flicker correction is not performed.

CITATION LIST

[Patent Literature]
[Patent Literature 1] Japanese Patent Laid-Open No. 2009-81684

SUMMARY OF INVENTION

Technical Problem

However, in the conventional method, the memory storing the line average values is refreshed every one third phase of the period between subsequent coincidences between the field period and the flicker period. Particularly, in the NTSC system affected by flicker of 60 Hz, a reference value, from which the influence of flicker is removed, is created by obtaining three average values of an average value delayed by 167 field period, an average value delayed by 334 field period, and an average value delayed by 500 field period. For this reason, there is a problem that, when there is a movement of the subject during the 500 field period, a correct reference value cannot be calculated and hence flicker cannot be detected, and there is also a problem that, even when the subject is stationary, it takes at least the 500 field period or longer until whether flicker exists or not is determined for the first time.

The present invention has been made to solve the above-described problems of the conventional method. An object of the present invention is to provide a flicker correction device, a flicker correction method, and a flicker correction program, each of which determines whether flicker exists or not, and corrects the flicker in a short time.

Solution to Problem

To this end, a flicker correction device according to the present invention is a flicker correction device for reducing 60 Hz flicker of an image captured at the field frequency of the NTSC system using an imaging element in which the exposure time for each line begins sequentially or an imaging element in which the exposure time for each point begins sequentially, and is configured by including: a line average value calculation section which calculates an average value for each line during the validity period of an input image signal; a storage section which stores, in the unit of one frame period, the average values obtained by the line average value calculation section; a movement detection section which detects movement from an output change between the average value obtained by the line average value calculation section, and the one-field preceding field average value stored in the storage section; a difference value calculation section which calculates a difference value between the average value obtained by the line average value calculation section, and the n-field preceding field (n: an integer multiple of 3) average value obtained in the storage section; a division value calculation section which calculates a division value by dividing the average value obtained by the line average value calculation section, by the difference value obtained by the difference value calculation section; a flicker component extraction section which extracts a flicker frequency from the result of the division value calculation section; a flicker determination section which determines whether flicker exists or not, and whether the flicker frequency is 60 Hz or not, from the results of the flicker component extraction section and of the movement detection section; a flicker correction gain calculation section which calculates a flicker correction gain synchronized with the flicker frequency from the result of the flicker determination section; and a flicker correction gain multiplication section which multiplies the image signal by the correction gain obtained by the flicker correction gain calculation section.

With this configuration, a flicker component, from which the influence of light and shade, and the like, of the subject is removed, can be extracted at high speed, and hence suitable flicker correction can be performed for various subjects.

Further, a flicker correction method according to the present invention is a flicker correction method for reducing flicker of an image captured by using an imaging element in which the exposure time for each line begins sequentially or an imaging element in which the exposure time for each point begins sequentially, and is configured to include: a line average value calculation step of calculating an average value for each line during the validity period of an input image signal; a storage step of storing, in the unit of one frame period, the average values obtained in the line average value calculation step; a movement detection step of detecting movement from an output change between the average value obtained in the line average value calculation step, and the one-field preceding field average value stored in the storage step; a difference value calculation step of calculating a difference value between the average value obtained in the line average value calculation step, and the n-field preceding field (n: an integer multiple of 3) average value obtained in the storage step; a division value calculation step of calculating a division value by dividing the average value obtained in the line average value calculation step, by the difference value obtained in the difference value calculation step; a flicker component extraction step of extracting a flicker frequency from the result obtained in the division value calculation step; a flicker determination step of determining whether flicker exists or not, and whether the flicker frequency is 60 Hz or not, from the results obtained in the flicker component extraction step and in the movement detection step; a flicker correction gain calculation step of calculating a flicker correction gain synchronized with the flicker frequency from the result obtained in the flicker determination step; and a flicker correction gain multiplication step of multiplying the image signal by the correction gain obtained in the flicker correction gain calculation step.

With this configuration, a flicker component, from which the influence of the light and shade, and the like, of the subject is removed, can be extracted at high speed, and hence suitable flicker correction can be performed for various subjects.

Further, a flicker correction program according to the present invention is a flicker correction program for reducing flicker of an image captured by using an imaging element in which the exposure time for each line begins sequentially or an imaging element in which the exposure time for each point begins sequentially, and is a flicker correction program for making a computer execute the following steps including: a line average value calculation step of calculating an average value for each line during the validity period of an input image signal; a storage step of storing, in the unit of one frame period, the average values obtained in the line average value calculation step; a movement detection step of detecting movement from an output change between the average value obtained in the line average value calculation step, and the one-field preceding field average value stored in the storage step; a difference value calculation step of calculating a difference value between the average value obtained in the line average value calculation step, and the n-field preceding field (n: an integer multiple of 3) average value obtained in the storage step; a division value calculation step of calculating a division value by dividing the average value obtained in the line average value calculation step, by the difference value obtained in the difference value calculation step; a flicker component extraction step of extracting a flicker frequency from the result obtained in the division value calculation step; a flicker determination step of determining whether flicker exists or not, and whether the flicker frequency is 60 Hz or not, from the results obtained in the flicker component extraction step and in the movement detection step; a flicker correction gain calculation step of calculating a flicker correction gain synchronized with the flicker frequency from the result obtained in the flicker determination step; and a flicker correction gain multiplication step of multiplying the image signal by the correction gain obtained in the flicker correction gain calculation step.

Advantageous Effects of Invention

The present invention provides an excellent effect that, even when the phase of the field period is slightly deviated from the phase of the flicker period, the flicker correction can be performed at high speed.

DESCRIPTION OF EMBODIMENTS

In the following, a flicker correction device for reducing flicker of an image captured by using an imaging element in which the exposure time for each line begins sequentially or an imaging element in which the exposure time for each point begins sequentially will be described with reference to the accompanying drawings.

Figure 1:
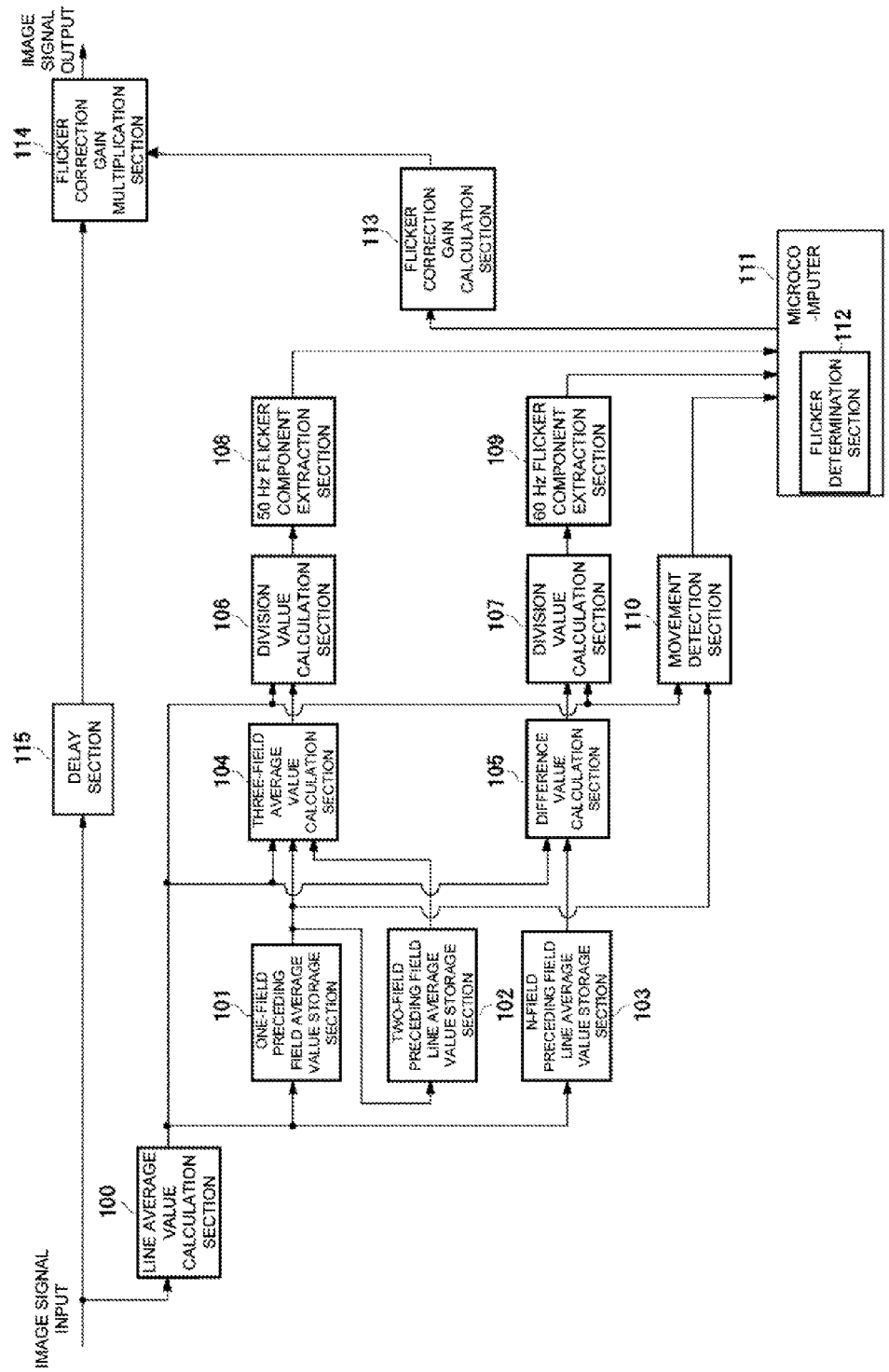
FIG. 1 is a block diagram showing a configuration of a flicker correction device according to an embodiment of the present invention.

FIG. 1 is a block diagram showing a configuration of a flicker correction device according to an embodiment of the present invention. In FIG. 1, reference numeral 100 denotes a line average value calculation section, reference numeral 101 is a one-field preceding field line average value storage section, reference numeral 102 denotes a two-field preceding field line average value storage section, reference numeral 103 denotes an n-field preceding field line average value storage section, reference numeral 104 denotes a three-field average value calculation section, reference numeral 105 denotes a difference value calculation section, reference numeral 106 denotes a first division value calculation section, reference numeral 107 denotes a second division value calculation section, reference numeral 108 denotes a 50 Hz flicker component extraction section, reference numeral 109 denotes a 60 Hz flicker component extraction section, reference numeral 110 denotes a movement detection section, reference numeral 111 denotes a microcomputer, reference numeral 112 denotes a flicker determination section, reference numeral 113 denotes a flicker correction gain calculation section, reference numeral 114 denotes a flicker correction gain multiplication section, and reference numeral 115 denotes a delay section.

The line average value calculation section 100 calculates an average value of each line during the validity period of an input image signal.

Each of the one-field preceding field line average value storage section 101 and the two-field preceding field line average value storage section 102 can store line average values for one field and outputs the line average values by delaying the line average values by the one field period. Similarly, the n-field preceding field line average value storage section 103 can store line average values for one field and outputs the line average values by delaying the line average values by arbitrary n-field periods.

The three-field average value calculation section 104 calculates an average value of an output y0 of the line average value calculation section 100, an output y-1 of the one-field preceding field line average value storage section 101, and an output y-2 of the two-field preceding field line average value storage section 102. That is, the three-field average value calculation section 104 calculates an average value of line average values at the same line position for each set of three fields, and thereby creates a reference value from which the influence of flicker is removed.

The first division value calculation section 106 divides the line average value outputted from the line average value calculation section 100 by the average value outputted from the three-field average value calculation section 104, and thereby obtains a flicker signal from which the light and shade of the subject is removed.

The difference value calculation section 105 subtracts an n-field preceding field line average value outputted from the n-field preceding field line average value storage section 103 from the line average value outputted from the line average value calculation section 100.

The second division value calculation section 107 divides the difference value outputted from the difference value calculation section 105 by the average value outputted from the line average value calculation section 100, and thereby obtains a flicker signal from which the light and shade of the subject is removed.

The 50 Hz flicker component extraction section 108 frequency-converts the flicker signal calculated by the first division value calculation section 106, and thereby extracts only the frequency area of the 50 Hz flicker components.

The 60 Hz flicker component extraction section 109 frequency-converts the flicker signal calculated by the second division value calculation section 107, and thereby extracts only the frequency area of the 60 Hz flicker components.

The movement detection section 110 compares the difference between the line average value outputted from the line average value calculation section 100 and the average value outputted from the one-field preceding field line average value storage section 101 with a threshold value, and thereby detects movement of the subject.

The flicker determination section 112 determines whether flicker exists or not, and whether the flicker frequency is 50 Hz or 60 Hz, on the basis of the detection result of the movement detection section 110, and the results of the 50 Hz flicker component extraction section 108, and of the 60 Hz flicker component extraction section 109.

On the basis of the result of the flicker determination section 112, the flicker correction gain generation section 113 generates a sinusoidal wave synchronized with the flicker frequency, by superposition of trigonometric functions.

The flicker correction multiplication section 114 reduces flicker of an inputted image by multiplying the image signal delayed and adjusted by the delay section 115 by the flicker correction gain.

The delay section 115 adjusts the delay amount corresponding to the period until the correction gain is generated for the input image signal.

The operations of the flicker correction device according to the present embodiment configured as described above will be described below. Note that it is obvious that the contents of the operations are based on a flicker correction method for reducing flicker of an image captured by using an imaging element in which the exposure time for each line begins sequentially or an imaging element in which the exposure time for each point begins sequentially, and that each of the operations (steps) can be carried out by using a computer. Further, such program is a flicker correction program for reducing flicker of an image captured by using an imaging element in which the exposure time for each line begins sequentially or an imaging element in which the exposure time for each point begins sequentially, and is a flicker correction program for making the computer execute each of the following operation (steps).

When an image signal, captured by using an imaging element in which the exposure time for each line begins sequentially or an imaging element in which the exposure time for each point begins sequentially, is inputted into the flicker correction device shown in FIG. 1, the image signal is inputted into the line average value calculation section 100 and the delay section 115. The line average value calculation section 100 calculates an average value for each line during the validity period of the input image signal. The calculated average value y0 is inputted into the one-field preceding field line average value storage section 101, the n-field preceding field line average value storage section 103, the three-field average value calculation section 104, the difference value calculation section 105, the first division value calculation section 106, the second division value calculation section 107, and the movement detection section 110.

The one-field preceding field line average value storage section 101 stores the inputted line average value y0, and outputs an average value y-1 delayed by one field period. The average value y-1 outputted from the one-field preceding field line average value storage section 101 is inputted into the two-field preceding field line average value storage section 102, the three-field average value calculation section 104, and the movement detection section 110. The two-field preceding field line average value storage section 102 stores the inputted line average value y-1 and outputs an average value y-2 delayed by one field period. Thereby, the line average values y0, y-1, and y-2 are inputted into the three-field average value calculation section 104. The three-field average value calculation section 104 calculates, for each same line, an average value of the average values of the three fields on the basis of the inputted line average values y0, y-1, and y-2, and thereby creates a reference value from which the influence of flicker is removed.

The average value calculated by the three-field average value calculation section 104 is inputted into the first division value calculation section 106. The first division value calculation section 106 divides the line average value outputted from the line average value calculation section 100 by the average value outputted from the three-field average value calculation section 104, and thereby outputs a flicker signal from which the light and shade of the subject is removed.

On the other hand, the difference value calculation section 105 subtracts an n-field preceding field line average value outputted from the n-field preceding field line average value storage section 103 from the line average value outputted from the line average value calculation section 100 and inputs the subtraction result into the second division value calculation section 107. The second division value calculation section 107 divides the difference value outputted from the difference value calculation section 105 by the average value outputted from the line average value calculation section 100, and thereby calculates a flicker signal from which the light and shade of the subject is removed.

The above described operations will be described with reference to the drawings.

Figure 2:
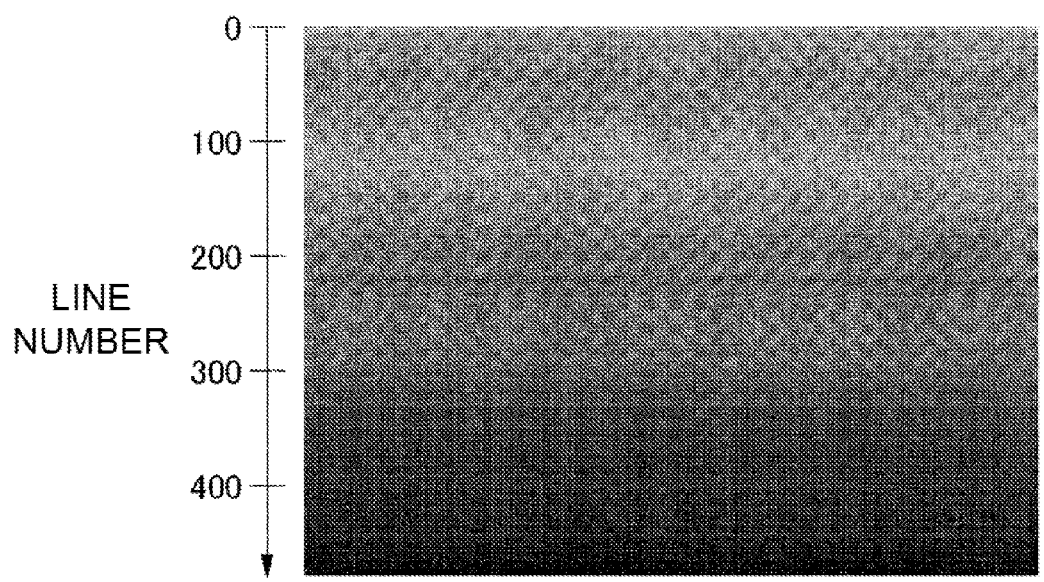
FIG. 2 shows an example of an image in which flicker is generated.

FIG. 2 shows an example of an image in the case where, under illumination of a common fluorescent lamp powered by an AC power supply (fp=50 Hz), a white chart is photographed by using an imaging device of the NTSC system in which the vertical scanning frequency (field frequency) is 59.94 Hz, and in which the horizontal scanning frequency is 15.75 kHz.

Figure 3:
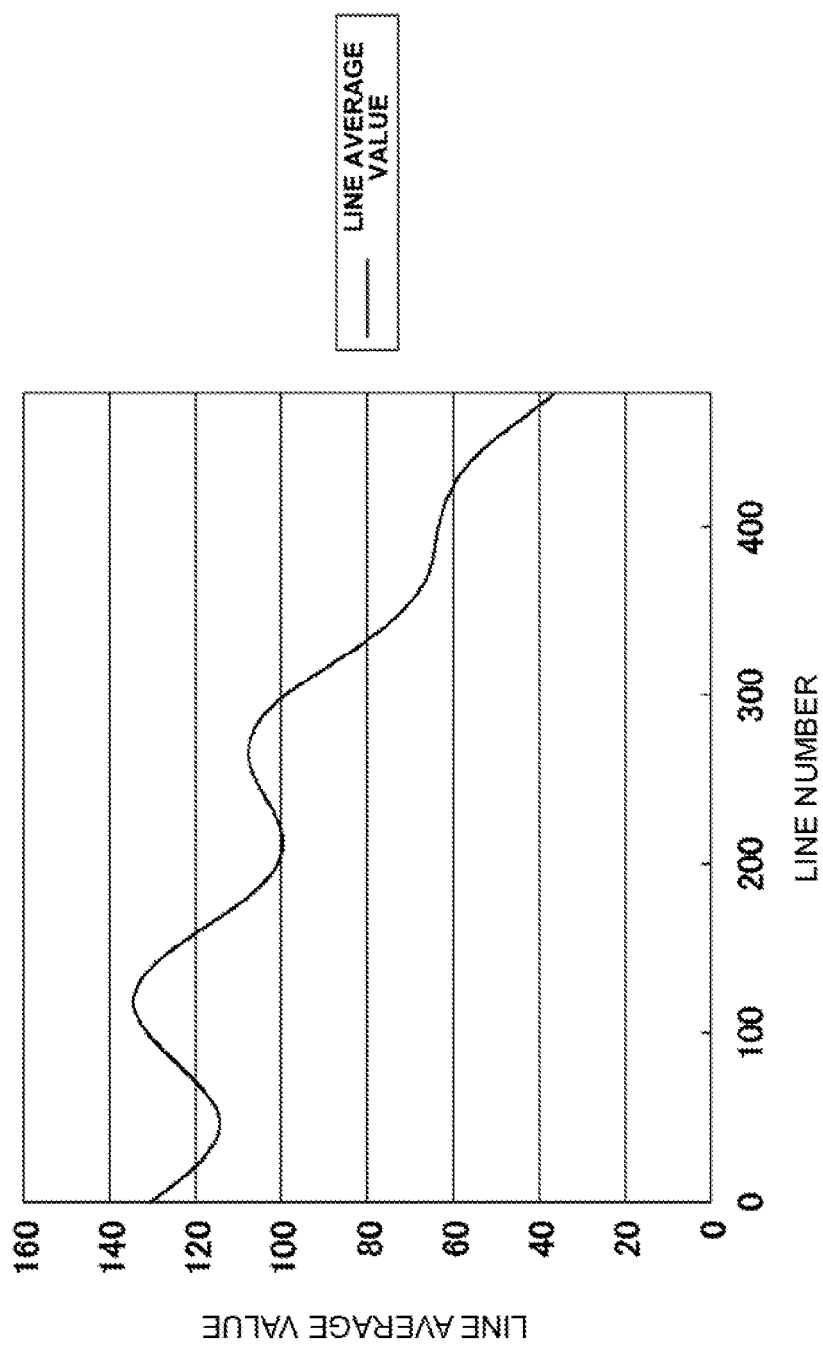
FIG. 3 shows line average values of the image in FIG. 2.

FIG. 3 shows a plot of line average values of the image in FIG. 2. As shown in FIG. 2, the line average values become a signal like the flicker component signal modulated by the light and shade of the subject.

The y-line average value Ys (Y, n) in the n frame is expressed by the following expression from the relationship between the power supply frequency and the drive frequency of the imaging element.

$$Ys(y, n) = Is(y)\left\{1 + A \cdot \sin\left(2\pi 2 f_p\left(\frac{y}{f_h} + \frac{n}{f_v}\right)\right)\right\}$$ [Expression 1]

Here, Is (y) denotes a DC component of y-line (corresponding to the light and shade of the subject), A denotes the magnitude of flicker, $f_h$ denotes the horizontal scanning frequency, $f_v$ denotes the vertical scanning frequency, and $f_p$ denotes the power supply frequency.

From this expression, it can be seen that as for the y line, a horizontal stripe appears at a line period of $f_h/(2\times f_p)$, and that as for the n frame, the phase is shifted by $(2\pi\times 2\times f_p)/f_v$ per one field.

That is, when $f_p$=50 Hz, a horizontal stripe appears at a line period of $f_h/(2\times f_p)$=15.75 kHz/100=157.5 Hz, and the phase is shifted per one field by $(2\pi\times 2\times f_p)/f_v$=2π×100/59.94 Hz≈π×(1+2/3). Thus, it is seen from the characteristics of trigonometric functions that the flicker at the time of $f_p$=50 Hz is circulated every three fields.

Similarly, since when $f_p$=60 Hz, a horizontal stripe appears at a line period of $f_h/(2\times f_p)$=15.75 kHz/120=131.25 Hz, and also the phase is shifted per one field by $(2\pi\times 2\times f_p)/f_v$=2π× 120/59.94 Hz≈2π×(2+1/500). Thus, it is seen from the characteristics of trigonometric functions that the flicker at the time of $f_p$=60 Hz is circulated every 500 fields.

Figure 4:
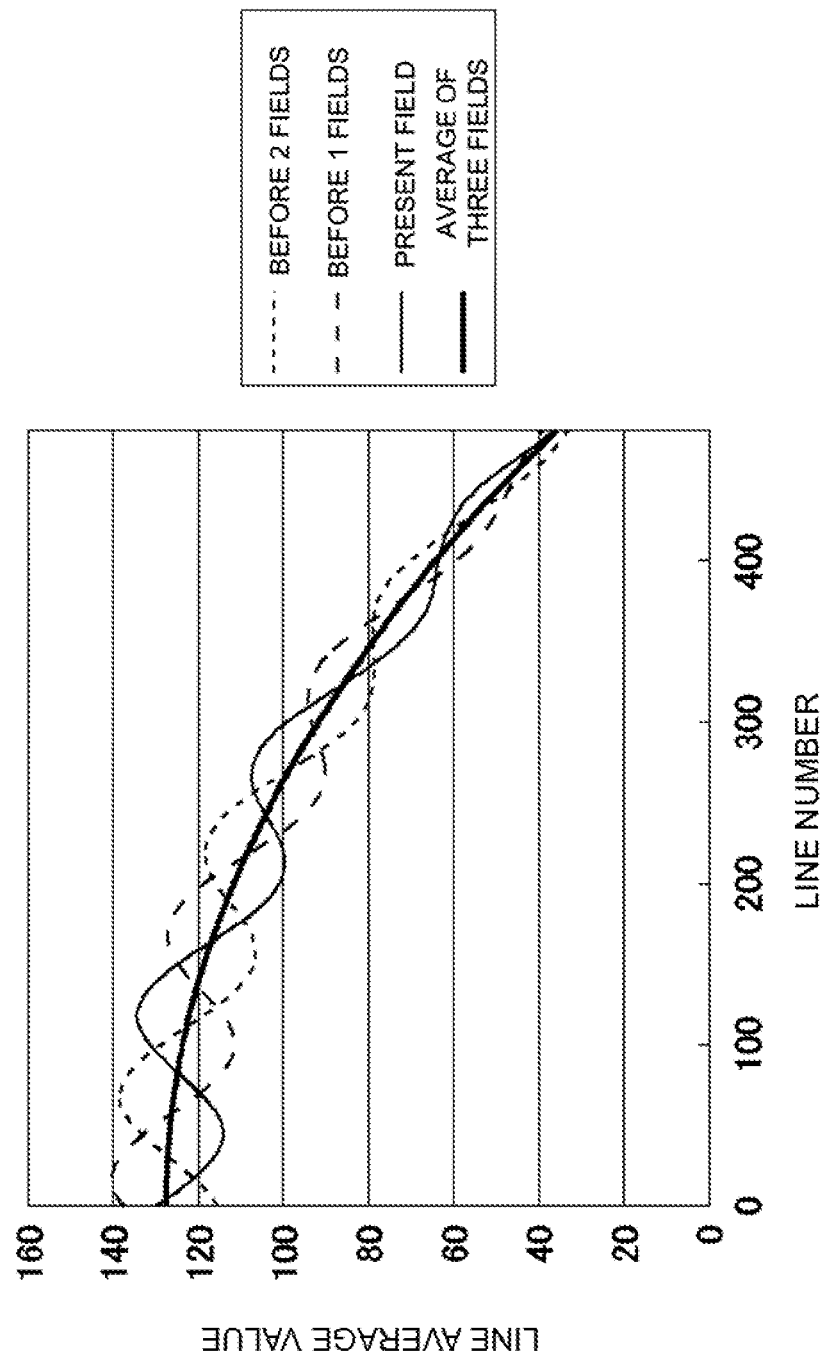
FIG. 4 shows line average values of three fields.

FIG. 4 shows a plot of line average values of the present field at the time of $f_p$=50 Hz, a plot of line average values of the one-field preceding field, a plot of line average values of the two-field preceding field, and a plot of average values, each of which is obtained by averaging, for each same line, the line average values of these three fields. As described above, since the line average value is circulated every three fields, the light and shade of the subject, from which the influence of flicker is removed, can be extracted by calculating, for each same line, an average value of the line average values of the three fields.

Figure 5:
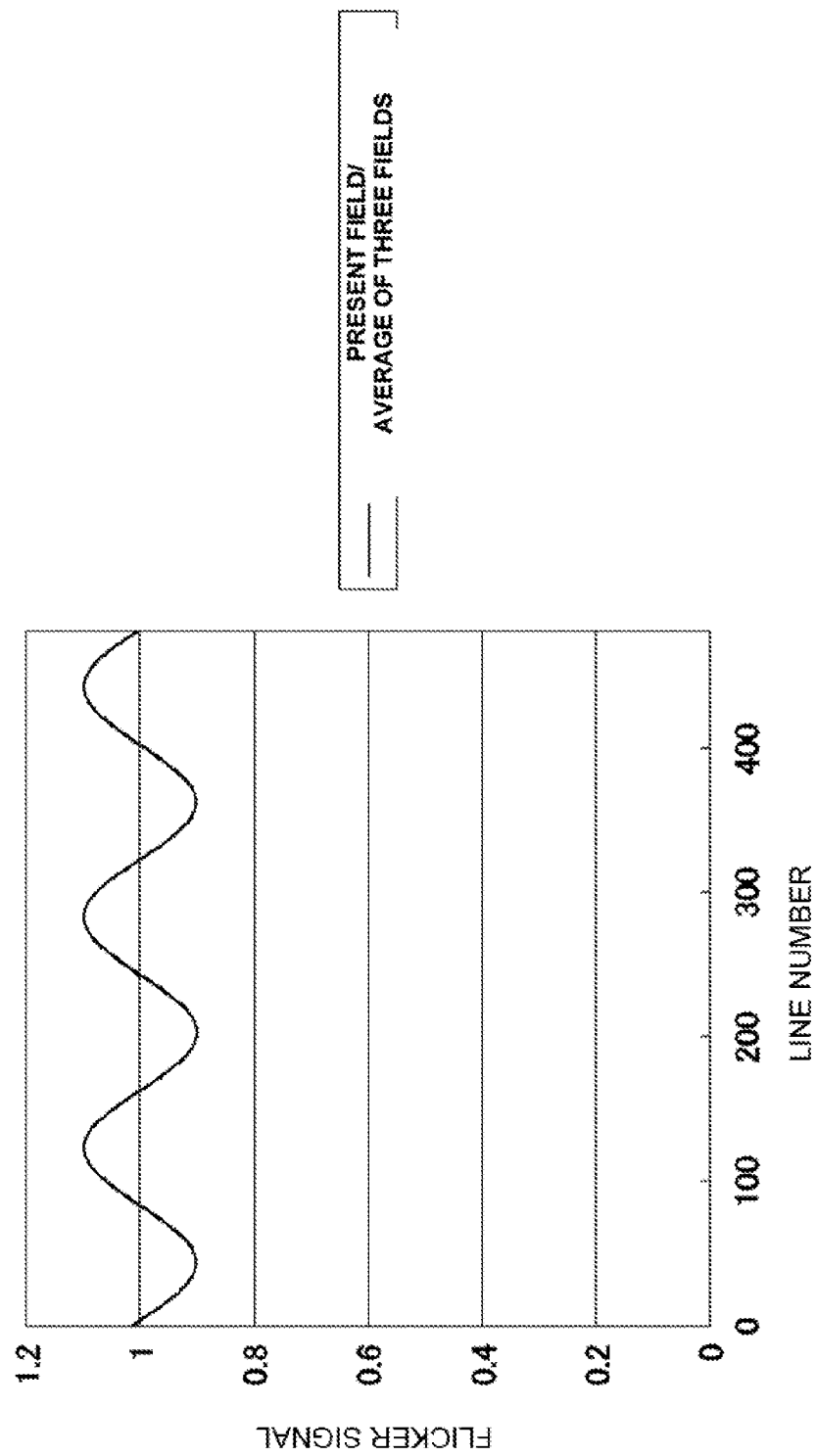
FIG. 5 shows results obtained by dividing the line average values of present field by the average values for the three fields.

FIG. 5 shows a result obtained by dividing the line average values of the present field by the above-obtained line average values of the three fields. As shown in FIG. 5, it is possible to extract a flicker signal from which the light and shade of the subject is removed.

Figure 6:
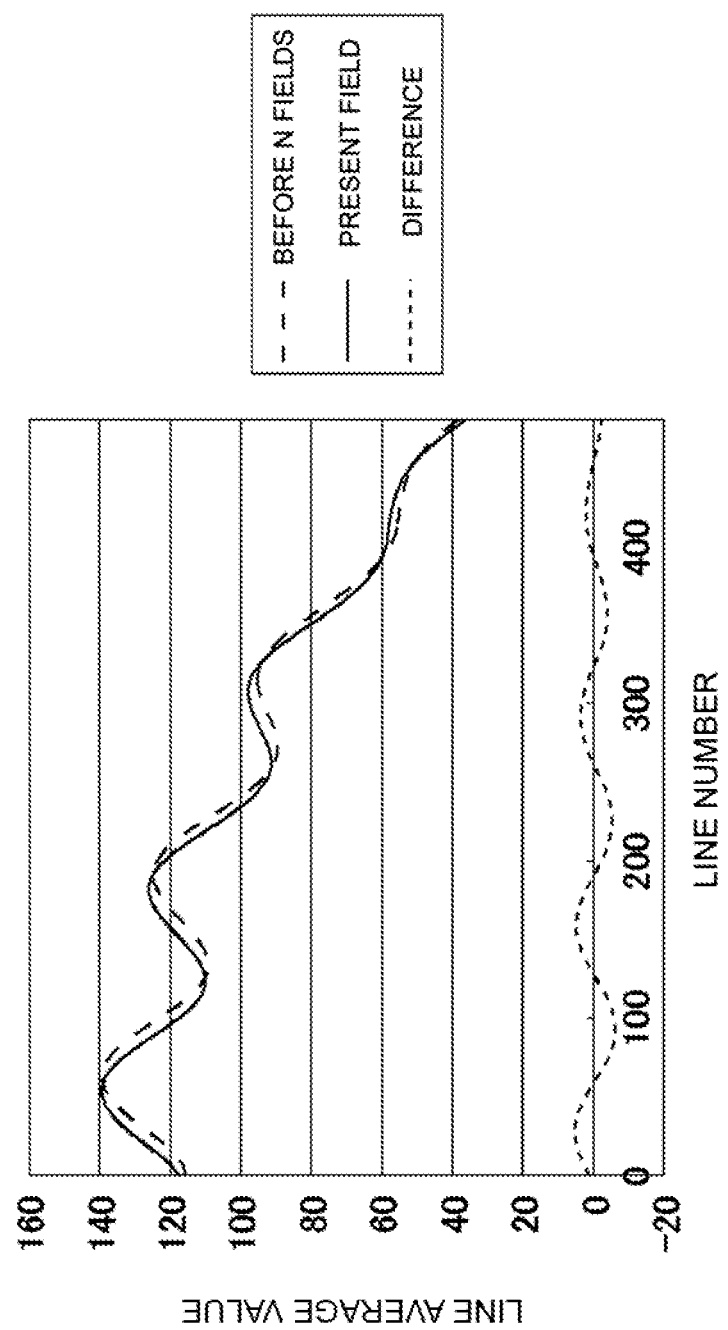
FIG. 6 shows difference values between the line average values of the present field and the line average values of the n-field preceding field.

FIG. 6 shows a plot of line average values of the present field at the time of $f_p$=60 Hz, a plot of line average values of the n-field preceding field, and a plot of difference values between the line average values of these two fields.

Figure 7:
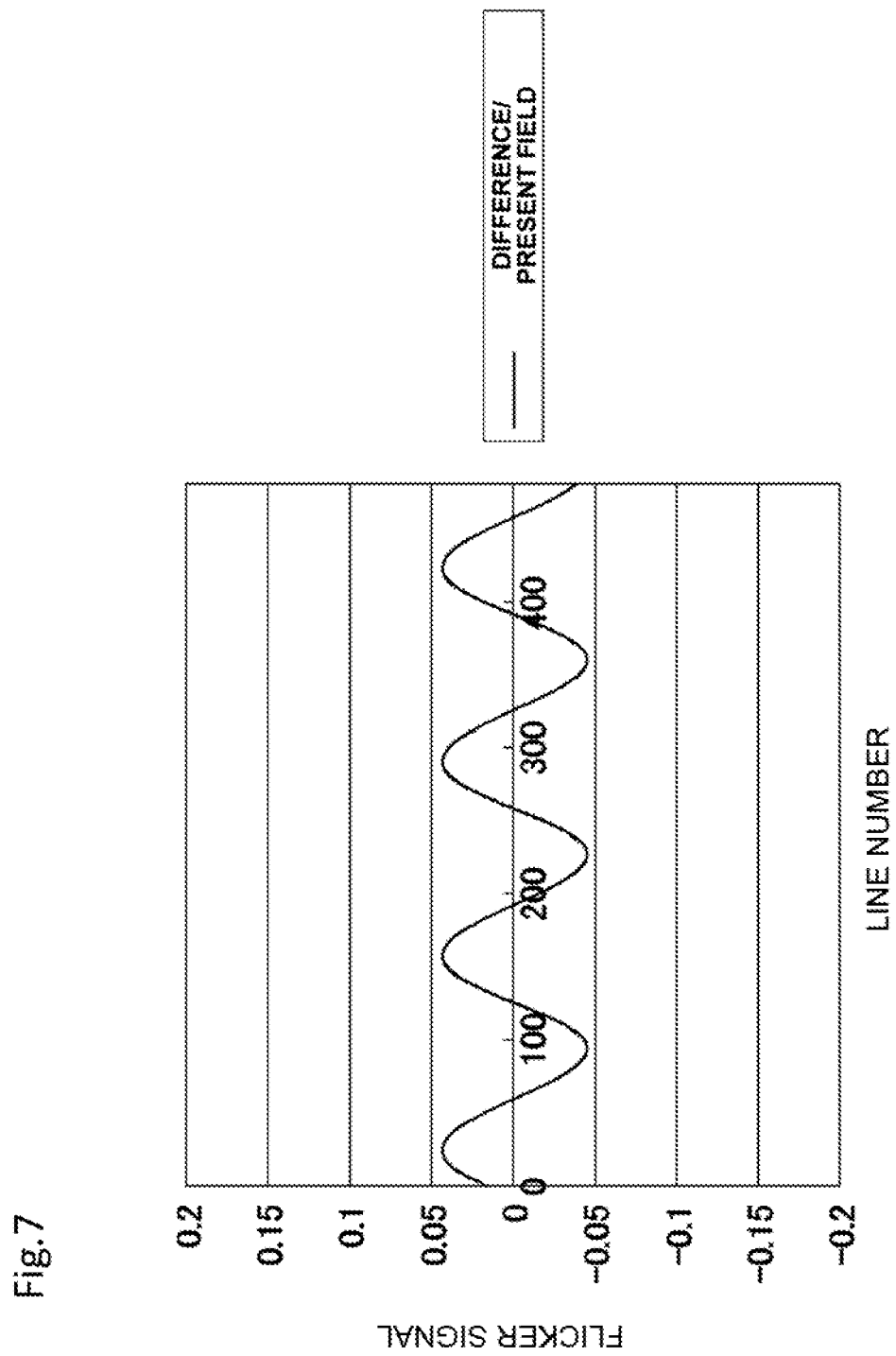
FIG. 7 shows results obtained by dividing the difference values by the line average values of the present field.

FIG. 7 shows a result obtained by dividing the above-obtained difference values of two fields by line average values of the present field. As shown in FIG. 7, it is possible to extract a flicker signal from which the light and shade of the subject is removed.

The extraction of the flicker signal, from which the light and shade of the subject is removed, will be described using expressions.

The line average values in n1 frame and the line average values in n2 frame are expressed by the following expression.

$$\begin{cases} Ys(y, n_1) = Is(y)\left\{1 + A \cdot \sin\left(2\pi 2 f_p\left(\frac{y}{f_h} + \frac{n_1}{f_v}\right)\right)\right\} \\ Ys(y, n_2) = Is(y)\left\{1 + A \cdot \sin\left(2\pi 2 f_p\left(\frac{y}{f_h} + \frac{n_2}{f_v}\right)\right)\right\} \end{cases}$$ [Expression 2]

The above expression is simplified into the following expressions [1] and [2], and from the expressions [1] and [2], ([2]−[1])/[2] is obtained as follows.

$$\begin{cases} Ys(y, n_1) = Is(y) + Is(y) \cdot A \cdot \sin\theta_1 & [1] \\ Ys(y, n_2) = Is(y) + Is(y) \cdot A \cdot \sin\theta_2 & [2] \end{cases} \text{ where } \theta_1 = 2\pi 2 f_p\left(\frac{y}{f_h} + \frac{n_1}{f_v}\right) \quad \theta_2 = 2\pi 2 f_p\left(\frac{y}{f_h} + \frac{n_2}{f_v}\right)$$ [Expression 3]

$$([2] - [1])/[2]$$

$$\frac{Ys(y, n_2) - Ys(y, n_1)}{Ys(y, n_2)} = \frac{Is(y) \cdot A \cdot \sin\theta_2 - Is(y) \cdot A \cdot \sin\theta_1}{Is(y) + Is(y) \cdot A \cdot \sin\theta_2}$$

$$= \frac{A \cdot \sin\theta_2 - A \cdot \sin\theta_1}{1 + A \cdot \sin\theta_2}$$

$$= \frac{A(\sin\theta_2 - \sin\theta_1)}{1 + A \cdot \sin\theta_2}$$

In flicker due to a common fluorescent lamp, since A≪1, the above expression: ([2]−[1])/[2] can be approximated by the following expression, and thereby a flicker signal, from which the influence of the light and shade of the subject is removed, can be extracted.

$$\approx A(\sin\theta_2 - \sin\theta_1)$$ [Expression 4]

In order to avoid the influence of 50 Hz flicker, n is usually set to a value, such as 9, 12, 15 and 18, which is a multiple of 3 and which enables a certain amount of line average value difference between the fields to be secured. Thereby, a 60 Hz flicker signal can be extracted by at least about ten frames.

The flicker signal outputted from the first division value calculation section 106 is inputted into the 50 Hz flicker component extraction section 108. The 50 Hz flicker component extraction section 108 frequency-converts the inputted flicker signal, to extract only the frequency area of the 50 Hz flicker components. The flicker components extracted by the 50 Hz flicker component extraction section 108 are inputted into the flicker determination section 112.

Further, the flicker signal outputted from the second division value calculation section 107 is inputted into the 60 Hz flicker component extraction section 109. The 60 Hz flicker component extraction section 109 frequency-converts the inputted flicker signal, to extract only the frequency area of the 60 Hz flicker components. The flicker components extracted by the 60 Hz flicker component extraction section 109 are inputted into the flicker determination section 112.

The movement detection section 110 compares a difference between the line average value outputted from the line average value calculation section 100, and the average value outputted from the one-field preceding field line average value storage section 101 with a threshold value, so that the existence or absence of movement of the subject is inputted into the flicker determination section 112.

On the basis of the detection result of the movement detection section 110, and the results of the 50 Hz flicker component extraction section 108 and of the 60 Hz flicker component extraction section 109, the flicker determination section 112 adjusts the flicker components according to the existence or absence of movement, and determines whether flicker exists or not, and whether the flicker frequency is 50 Hz or 60 Hz. Thereby, the flicker components based on the determination results are inputted into the flicker correction gain generation section 113.

On the basis of the results of the flicker determination section 112, the flicker correction gain generation section 113 generates a sinusoidal wave synchronized with the flicker frequency, by superposition of trigonometric functions, and inputs the generated sinusoidal wave into the flicker correction multiplication section.

The flicker correction multiplication section 114 multiplies the image signal delayed and adjusted by the delay section 115 by a flicker correction gain. The signal subjected to flicker correction is outputted from the flicker correction multiplication section 114.

As described above, with the flicker correction device according to the present embodiment, it is possible to provide a device, a method, and a program, each of which, even when the phase of the field period is slightly deviated from the phase of the flicker period, detects the flicker frequency and performs adjustment at high speed.

[Industrial Applicability]

As described above, the device, method and program for flicker correction according to the present invention, can detect the flicker frequency and perform adjustment at high speed even when the phase of the field period is slightly deviated from the phase of the flicker period. Thus, the device, method and program for flicker correction according to the present invention are useful in the field of camera systems, such as a movie camera, an in-vehicle camera, and a portable camera, in which the photographing location is not fixed, and in which flicker correction for different frequencies is required.

Reference Signs List

100 Line average value calculation section
101 One-field preceding field line average value storage section
102 Two-field preceding field line average value storage section
103 N-field preceding field line average value storage section
104 Three-field average value calculation section
105 Difference value calculation section
106 First division value calculation section
107 Second division value calculation section
108 50 Hz flicker component extraction section
109 60 Hz flicker component extraction section
110 Movement detection section
111 Microcomputer
112 Flicker determination section
113 Flicker correction gain calculation section
114 Flicker correction gain multiplication section
115 Delay section

The invention claimed is:

1. A flicker correction device for reducing 60 Hz flicker of an image captured at a field frequency of an NTSC system using an imaging element in which the exposure time for each line begins sequentially or an imaging element in which the exposure time for each point begins sequentially, the flicker correction device comprising:
   a line average value calculation section which calculates an average value for each line during the validity period of an input image signal;
   a storage section which stores, in the unit of one frame period, the average values obtained by the line average value calculation section;
   a movement detection section which detects movement from an output change between the average value obtained by the line average value calculation section, and the one-field preceding field average value stored in the storage section;
   a difference value calculation section which calculates a difference value between the average value obtained by the line average value calculation section, and the n-field preceding field (n: an integer multiple of 3) average value obtained in the storage section;
   a division value calculation section which calculates a division value by dividing the average value obtained by the line average value calculation section, by the difference value obtained by the difference value calculation section;
   a flicker component extraction section which extracts a flicker frequency from the result of the division value calculation section;
   a flicker determination section which determines whether flicker exists or not, and whether the flicker frequency is 60 Hz or not, from the results of the flicker component extraction section and of the movement detection section;
   a flicker correction gain calculation section which calculates a flicker correction gain synchronized with the flicker frequency from the result of the flicker determination section; and
   a flicker correction gain multiplication section which multiplies the image signal by the correction gain obtained by the flicker correction gain calculation section.

2. A flicker correction method for reducing flicker of an image captured by using an imaging element in which the exposure time for each line begins sequentially or an imaging element in which the exposure time for each point begins sequentially, the flicker correction method comprising:
- a line average value calculation step of calculating an average value for each line during the validity period of an input image signal;
- a storage step of storing, in the unit of one frame period, the average value obtained in the line average value calculation step;
- a movement detection step of detecting movement from an output change between the average value obtained in the line average value calculation step, and the one-field preceding field average value stored in the storage step;
- a difference value calculation step of calculating a difference value between the average value obtained in the line average value calculation step, and the n-field preceding field (n: an integer multiple of 3) average value obtained in the storage step;
- a division value calculation step of calculating a division value by dividing the average value obtained in the line average value calculation step, by the difference value obtained in the difference value calculation step;
- a flicker component extraction step of extracting a flicker frequency from the result obtained in the division value calculation step;
- a flicker determination step of determining whether flicker exists or not, and whether the flicker frequency is 60 Hz or not, from the results obtained in the flicker component extraction step and in the movement detection step;
- a flicker correction gain calculation step of calculating a flicker correction gain synchronized with the flicker frequency from the result obtained in the flicker determination step; and
- a flicker correction gain multiplication step of multiplying the image signal by the correction gain obtained in the flicker correction gain calculation step.

* * * * *